US008554665B1

(12) United States Patent
Zettner et al.

(10) Patent No.: US 8,554,665 B1
(45) Date of Patent: Oct. 8, 2013

(54) SELF SERVICE RATE LOCK

(75) Inventors: Steve D. Zettner, San Antonio, TX (US); Kevin Fiedler, Helotes, TX (US); Robert K. Dibble, Fair Oaks Ranch, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 336 days.

(21) Appl. No.: 11/868,769

(22) Filed: Oct. 8, 2007

(51) Int. Cl.
*G06Q 40/00* (2012.01)

(52) U.S. Cl.
USPC .............................................. 705/38; 705/35

(58) Field of Classification Search
USPC ....................................... 705/38, 35
See application file for complete search history.

(56) References Cited

U.S. PATENT DOCUMENTS

| | | | | |
|---|---|---|---|---|
| 2001/0029482 A1* | 10/2001 | Tealdi et al. | ..................... | 705/38 |
| 2002/0069122 A1* | 6/2002 | Yun et al. | ......................... | 705/26 |
| 2003/0041025 A1* | 2/2003 | Bonalle et al. | .................. | 705/39 |
| 2003/0061162 A1* | 3/2003 | Matthews | ........................ | 705/41 |
| 2006/0004651 A1* | 1/2006 | Corr et al. | ....................... | 705/38 |
| 2006/0015364 A1* | 1/2006 | Hays | ................................. | 705/1 |

OTHER PUBLICATIONS

Berry, Kate; "Pipeline: Wamu Looks to Break from HELOC Pack"; Apr. 30, 2007; American Banker; ISSN: 0002-7561.*

Multi-Housing News'; "Freddie Mac's new floating-rate financings find favor iwth borrowers; Capped ARMs prove hugely popular; fiexed-to-float-to-fixed laons less so."; Oct. 2004; ISSN: 0146-0919.*
McGorman, Gerry; "Derivatives: lenders secret touch; the much maligned instruments give borrowers more alternatives, and lenders better pricing"; ABA Banking Journal; Sep. 1995; ISSN: 0194-5947.*
"How to Lock in Interest Rates for a Home Loan," *eHow*, http://www.ehow.com/how_6338_lock-interest-rates.html, downloaded 2007, 3 pages.
"Introducing Our Home Equity Total Line of Credit," *NBSC*, http://www.nationalbanks.com/index.cfm?ID=1083, downloaded 2007, 1 page.
"Orange Home Equity," *ING Direct*, http://www.home.ingdirect.com/products/products.asp?=OrangeHomeEquity, downloaded 2007, 1 page.
"What is a Rate Lock?" *Compare Interest Rates*, http://www.compareinterestrates.com/ratelock.htm, downloaded 2007, 3 pages.

* cited by examiner

*Primary Examiner* — Edward Chang
(74) *Attorney, Agent, or Firm* — Kilpatrick Townsend & Stockton LLP

(57) ABSTRACT

Systems and methods are disclosed for enabling a borrower to rate lock a line of credit. An offer to rate lock at least a portion of the borrower's line of credit may be presented to the borrower. The rate lock offer may include converting an advanced amount, and/or an amount that is available to be advanced, from the borrower's line of credit to a fixed rate loan having a fixed interest rate, a fixed loan duration, and/or a fixed payment schedule. After the borrower has accepted the offer, the rate lock may be executed. The disclosed embodiments may enable the borrower to electronically obtain the rate lock without any human intervention.

21 Claims, 16 Drawing Sheets

FIG. 5B

Lock In a Home Equity line of Credit Rate

① Lock My Rate  ② Verify  ③ Confirmation

Please verify that the following information is correct. To make changes, click the appropriate Edit link.

Rate Lock Information   Edit ◄——— 611

| | |
|---|---|
| Home Equity Line: | HOME EQUITY LINE - 8113604623 - $90,000.00 |
| Todays Annual Percentage Rate: | 7.04% Fixed |
| Rate Lock Ammount: | $12,500 |
| Rate Lock Term: | 180 months |
| Estimated Total Monthly Payment: | $480 |
| Estimated First Payment: | $683 |
| Advance From: | HOME EQUITY LINE - 8113604623 |
| Advance To: | CHECKING 5862423 |
| Advance Amount: | $1,000 |

Documents Online

Sign up to receive your documents online at _____ and begin enjoying the many benifits.

Select your preference:
- ☐ Deliver my Loan Documents online.  ◄—— 621
- ☐ Deliver all Documents Online.  ◄—— 622

The requested transfer will remove funds from your home equity line of credit account.
Transaction requested after 9 p.m. CT, Monday through Friday, and all day on weekends and holidays, will be available in your account the next business day.
By clicking the "Submit" button, you are authorizing to complete this transaction.

Users Can:
- Sign up for UDO

SELF SERVICE RATE LOCK

CROSS REFERENCE TO RELATED APPLICATIONS

This application is related by subject matter to the following commonly assigned applications, the entirety of which are hereby incorporated by reference herein: U.S. patent application Ser. No. 11/868,822, U.S. patent application Ser. No. 11/868,834, U.S. patent application Ser. No. 11/868,777, U.S. patent application Ser. No. 11/868,836, all filed on Oct. 8, 2007 and all entitled "SELF SERVICE RATE LOCK."

BACKGROUND

Borrowers may obtain credit from lenders under a variety of terms and conditions. For example, a homeowner may borrow money from a lender based on the amount of equity the homeowner has accumulated in his or her house, i.e., the value of the homeowner's unencumbered interest in the property. The money may be borrowed as a home equity line of credit, which may allow the borrower to withdraw the money as needed up to a specified credit limit. The interest on the line of credit may be variable and, therefore, may fluctuate depending upon the general conditions in the credit markets. Interest may only accrue on the money that actually has been advanced from the line of credit. Thus, if the borrower has a $30,000 line of credit and takes a $20,000 advance, the borrower may only owe interest on the $20,000 and not on the $10,000 remaining in the line of credit.

The home equity line of credit typically does not have a fixed term and, like a credit card, may have a small minimum monthly payment. As such, the money that has been advanced from the line of credit may continue to accrue interest until the borrower has paid the outstanding balance in full. In some instances where the borrower only pays the minimum payment each month, the payment may only cover a portion of the accrued interest, resulting in negative amortization. That is, the unpaid interest increases the principal balance owed. This may lead to an ever-increasing debt load that extends into the future indefinitely.

In addition to, or in lieu of, a home equity line of credit, a homeowner may also borrow money as a fixed rate home equity loan in which the interest rate, the loan amount, the payment schedule, and the loan duration are all fixed. For example, a borrower may take out a $20,000 loan with an interest rate of 7% and a term of 60 months, or 5 years. The borrower will have a monthly payment of approximately $396, and the loan balance will be paid in full at the end of the loan term. Thus, one of the advantages of a loan over a line of credit is that the loan allows a borrower to budget a set monthly payment with the expectation that the loan amount will be paid in full at a specified time in the future.

Due to the flexibility associated with a line of credit, it is not uncommon for a borrower to initially set up a line of credit, such as a home equity credit line, to meet his or her financial needs. However, as the borrower uses the available credit, the borrower may wish to convert a portion or all of the credit line into a fixed rate loan to facilitate repayment of the borrowed money. This process may require the borrower to contact a customer service representative associated with the financial institution that has issued the borrower's line of credit. As is often the case, there may only be a limited number of representatives and the borrower may be required to wait on the phone until a representative becomes available. This process is time consuming and inconvenient, and may deter the borrower from converting the line of credit into a fixed rate loan.

In addition, if the borrower wishes to change one or more terms of the fixed rate loan offered by the financial institution, the customer service representative may not be trained or authorized to execute the transaction with modified terms. As a result, the representative may be required to seek and the advice and/or approval of a trained specialist or manager. This may further delay and complicate the process of converting the borrower's outstanding line of credit to a fixed rate loan. Therefore, there is a need for a self-service system and method for enabling a borrower to conveniently convert a portion or all of the borrower's outstanding line of credit into a fixed rate loan without requiring human intervention by the lender.

SUMMARY

The disclosed embodiments are directed to systems and methods for enabling a borrower to rate lock a line of credit. In an embodiment, an offer to rate lock an amount advanced from a borrower's line of credit may be electronically generated. The offer may be electronically presented to the borrower. A response indicating the borrower's acceptance of the offer may be electronically received. The rate lock on the amount advanced from the line of credit may then be electronically executed.

In another embodiment, an offer to rate lock a sum of an amount advanced from a borrower's line of credit and an amount that is available to be advanced from the borrower's line of credit may be electronically generated. The offer may be electronically presented to the borrower. A response indicating the borrower's acceptance of the offer may be electronically received. The amount that is available to be advanced may then be electronically advanced to the borrower, and the rate lock on the sum of the two amounts may be electronically executed.

In another embodiment, an offer to rate lock an amount that is available to be advanced from a borrower's line of credit may be electronically generated and presented to the borrower. A response indicating the borrower's acceptance of the offer may be electronically received. The amount that is available to be advanced may then be electronically advanced to the borrower, and the rate lock on the advanced amount may be electronically executed.

In yet another embodiment, an offer to rate lock an amount associated with a borrower's line of credit may be electronically generated and presented to the borrower. A counter-offer may be electronically received from the borrower. The counter-offer may include a request to modify at least one term of the offer. The offer may be electronically modified based on the counter-offer. The modified offer may then be presented to the borrower. A response indicating the borrower's acceptance of the modified offer may be electronically received, and the rate lock on the amount associated with the borrower's line of credit may be electronically executed.

In yet another embodiment, multiple pre-defined rate lock offers may be electronically generated. Each offer may define a different rate lock for an amount associated with the borrower's line of credit. The offers may be electronically presented to the borrower. A response may be electronically received indicating the borrower's acceptance of at least one of the offers. A rate lock associated with each accepted offer may be electronically executed.

BRIEF DESCRIPTION OF THE DRAWINGS

The foregoing and other objects, aspects and advantages of the disclosed embodiments will be better understood from the following detailed description with reference to the drawings.

FIGS. 5A and 5B are exemplary representations of a screen display presented to the user, where information pertaining to an additional advance of funds for the rate lock offer shown in FIG. 4 is provided.

FIG. 6 is an exemplary representation of a screen display presented to the user, where information pertaining to the rate lock offer shown in FIGS. 4, 5A and 5B is provided for verification.

DETAILED DESCRIPTION OF ILLUSTRATIVE EMBODIMENTS

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The disclosed embodiments are directed to systems and methods for enabling a borrower to rate lock a line of credit. For example, an offer to rate lock at least a portion of the borrower's line of credit may be presented to the borrower via a web page that is hosted by a financial institution's server. The rate lock offer may include converting an amount advanced from the borrower's line of credit to a fixed rate loan having a fixed interest rate, a fixed loan duration, and/or a fixed payment schedule. After the borrower has accepted the offer (e.g., by clicking an "I accept" button on the web page), the rate lock on the advanced amount may be executed via the server. It will be appreciated that the disclosed embodiments may provide the borrower with a self-service rate lock mechanism, i.e., enable the borrower to electronically obtain the rate lock without any human intervention. For example, the borrower may obtain the rate lock without the assistance of a customer or financial service representative associated with the institution offering the rate lock.

Figure 1:
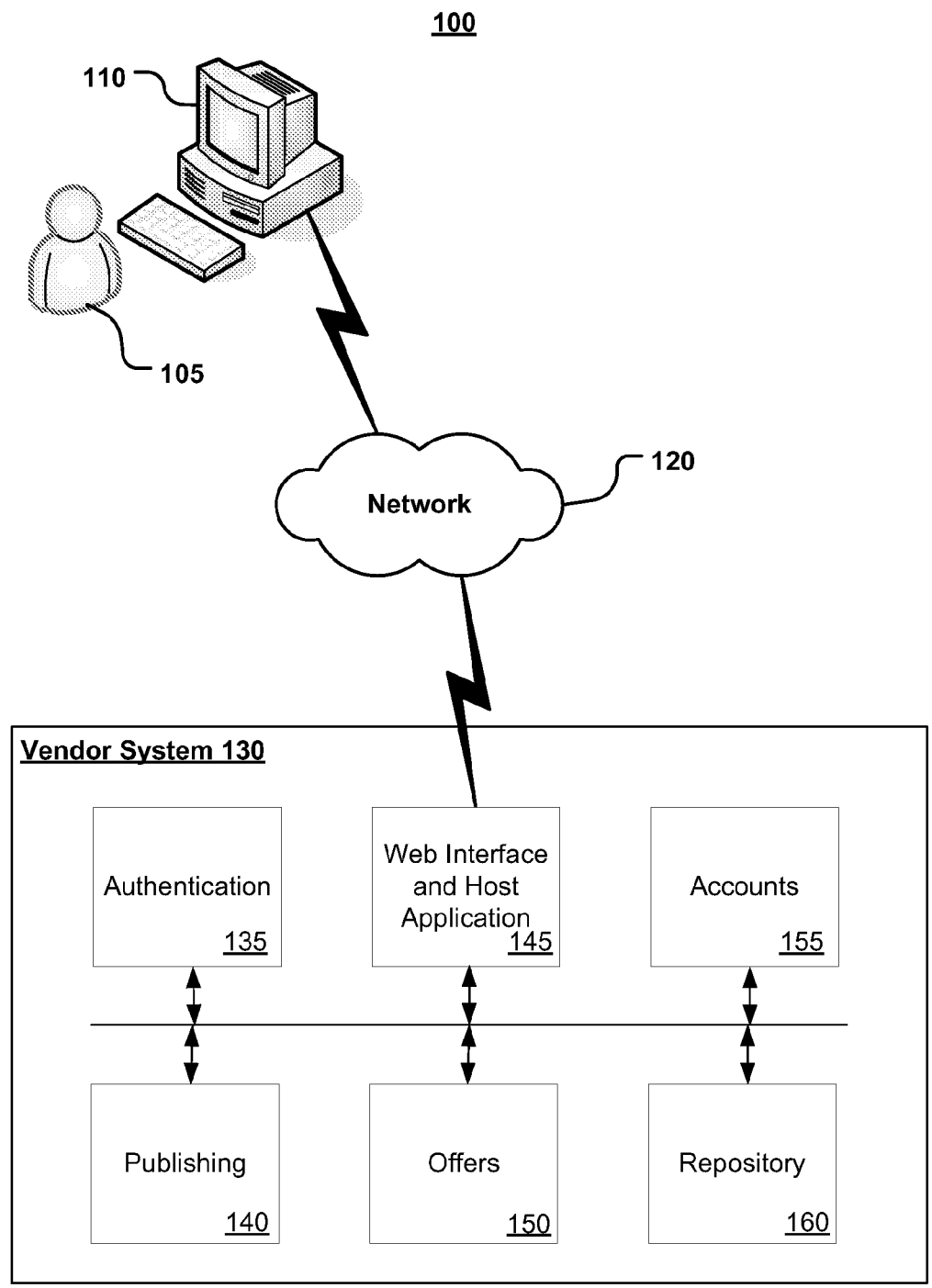
FIG. 1 is a diagram of an exemplary system for enabling a user to rate lock at least a portion of the user's line of credit.

FIG. 1 depicts an exemplary system 100 in which various embodiments may be implemented. Of course, actual network and database environments may be arranged in a variety of configurations. The illustrated system 100 provides a framework for understanding the type of environment in which one or more embodiments may operate.

As shown in FIG. 1, a vendor system 130 may be in communication with a user 105 of an electronic device 110 via a network 120. The vendor system 130 may be associated with and/or maintained by a financial institution, such as a bank, a credit union, an investment bank, a brokerage firm, an insurance company, and the like. The user 105 may be a customer or member of the financial institution. For example, the user 105 may be an account owner with one or more accounts at the financial institution, such as a savings account, a checking account, a brokerage account, an asset management account, insurance policy, and the like. In addition, the user 105 may be a borrower and, therefore, may have one or more mortgages, credit cards, home equity loans, lines of credit, etc., with the financial institution.

The user 105 may communicate with the vendor system 130 using, for example, the electronic device 110. The electronic device 110 may include hardware components such as a processor, a graphics card, a storage component, a memory component, a memory card reader, an antenna, a communication port, a disc drive, a modem, and the like. The electronic device 110 may also include software components such as an operating system that may control the hardware components. The electronic device 110 may include any other suitable components such that the user 105 may receive information from the vendor system 130 via the network 120. In particular, as will be further discussed below, one or more rate lock offers may be presented to the user 105 by the vendor system 130. According to various exemplary embodiments, the electronic device 110 may be a general purpose and/or a special purpose computing device, such as a desktop personal computer (PC), a laptop PC, a personal digital assistant (PDA), a cellular telephone, and the like.

As shown in FIG. 1, the electronic device 110 may be in communication with the vendor system 130 via the network 120. The network 120 may be any suitable communications network, such as a local-area-network (LAN), a wide-area-network (WAN), an Intranet, the Internet, a public switched telephone network (PSTN), a cellular network, a Voice over Internet Protocol (VoIP) Network, and the like. The vendor system 130 may include any combination of hardware components such as processors, databases, storage drives, registers, cache, random access memory (RAM) memory chips, data buses, and the like. The vendor system 130 may further include any combination of software components, such as operating systems, database management applications, and the like. According to an exemplary embodiment, the vendor system 130 may be a network-based server that provides financial information and services to the user 105, such as providing lending offers, maintaining financial accounts, and the like.

The vendor system 130 may include any combination of systems and sub-systems. In accordance with the disclosed embodiments, the vendor system 130 may include an authentication module 135, a publishing module 140, a web interface and host application 145, an offers module 150, an accounts module 155, and a repository module 160. The authentication module 135, the publishing module 140, the web interface and host application 145, the offers module 150, the accounts module 155, and the repository module 160 may be in operative communication with one another via, for example, a bus or any other subsystem that may transfer data between computer components, such as the modules in the vendor system 130.

The web interface and host application 145 of the vendor system 130 may interface with the network 120 to enable communications between the user's electronic device 110 and the various components and features of the vendor system 130. The web interface and host application 145 may include software components such as operating systems, web-based management applications, and the like, such that the web interface and host application 145 may provide the overall infrastructure that facilitates access to account information, offer information, and the like, that may be stored and published by the vendor system 130. The web interface and host application 145 may maintain its own processes, such as user management, account and/or offer rules to make intelligent use of the account information, offer information, and the like, that may be provided to and by the user 105 via the electronic device 110, for example. The web interface and host application 145 may also serve to interact and interface with the other functional components of the vendor system 130 including the authentication module 135, the publishing module 140, the offers module 150, the accounts module 155, and the repository module 160.

Additionally, the web interface and host application 145 may present a web interface to the user 105 via the electronic device 110. For example, the web interface and host application 145 may provide an interface to handle the submission of account management requests such as requesting information on current lending options, transferring funds from one account to another, paying bills electronically, and the like. According to an embodiment, the web interface and host application 145 may provide a user management function that may be responsible for maintaining the association of users with accounts and/or offers that may be provided to each of the users. Thus, the web interface and host application 145 may receive user account requests from the user 105 and may provide a display, such as a web page, that may include account information and/or offers available to the user 105 according to an exemplary embodiment.

The authentication module 135 may include any combination of hardware components such as processors, databases, storage drives, registers, cache, RAM memory chips, data buses, and the like, and/or software components such that the authentication module 135 may provide a mechanism for authentication of the user 105 before any account requests and/or account information may be displayed by the vendor system 130. Typically, the user 105 may be authenticated by supplying a credential such as an account number, username, personal identification number (PIN), password, and the like before services provided by the vendor system 130 may be used. Additionally, once the user 105 has been authenticated, the vendor system 130 may cache the authentication status to prevent unnecessary external authentication requests, for example. The authentication module 135 may also verify whether the user 105 may be eligible for account information and/or offer information from the vendor system 130.

The authentication module 135 may perform any authentication itself. Additionally, the authentication module 135 may delegate authentication authority to an authentication mechanism such as a web-based authentication service. In an embodiment, the authentication module 135 may include bridges to various possible points of authentication such as the host application, the user's enterprise domain, or local cache of the vendor system 130. Additionally, the passing of session-specific tokens, or other artifacts, to identify the context under which the user 105 may interact with the vendor system 130 may be managed by the authentication module 135 in co-operation with the web interface and host application 145.

The publishing module 140 may include any combination of hardware components such as processors, databases, storage drives, registers, cache, RAM memory chips, data buses, and the like, and/or software components. The user 105 and/or processes internal to the vendor system 130 may use the publishing module 140 to manipulate, display, and/or manage data such as account information and/or offer information including, but not limited to, account balances, interest rates, lines of credit, rate locks, available credit, potential credit, lending offers, and the like that may be provided by the vendor system 130, for example.

The vendor system 130 may deliver data for accounts and/or offers in a variety of ways including, but not limited to, Hypertext Transfer Protocol (HTTP) and/or Secure Hypertext Transfer Protocol (HTTP/S) for simple Web-based access, Simple Main Transfer Protocol (SMTP) for e-mail notifications of accounts and/or offers, Web Services/Simple Object Access Protocol (SOAP) for a programmatic way to access the data for accounts and/or offers, and Sharepoint for online review and collaboration of data for accounts and/or offers. For example, according to an embodiment, the publishing module 140 may generate displays such as a web page that may be delivered to the user 105 via HTTP.

The offers module 150 may be adapted to store information corresponding to offers such as pre-approved loans, pre-approved lines of credit, rate locks, and the like. Additionally, the offers module 150 may be configured to determine whether the user 105 may be eligible to receive one or more offers stored therein. The offers module 150 may include, for example, a database, RAM memory chips, cache, registers, hard drives, or any other suitable hardware components designed to store data such as potential lending offers that may be available to the user 105. According to an embodiment, the offers stored in the offers module 150 may be indexed by the credential such as the account number, username, personal identification number (PIN), password, and the like that may be provided by the user 105 to access the vendor system 130. For example, the offers module 150 may include a database that may include a list of offers currently provided by the vendor system 130. The offers list may be implemented as a tree within the offers module 150 such that the credential may be the root of the tree. Alternatively, the offers list may be organized as hierarchy with the credential being the top of the hierarchy. Under each credential in the tree or hierarchy may be, for example, offer information corresponding to each offer that the user 105 may be eligible to receive.

The accounts module 155 may be adapted to store information corresponding to current accounts such as loans, lines of credit, and the like. The accounts module 155 may include, for example, a database, RAM memory chips, registers, cache, hard drives, or any other suitable hardware components designed to store data such as current account balances, lending credit lines, interest rates, or the like for the user 105. According to an embodiment, the accounts that may be stored in accounts module 155 may be indexed by the credential such as the account number, username, Personal Identification Number (PIN), password, and the like. For example, accounts module 155 may include a database that may include a list of accounts active for a particular user. The accounts list may be implemented as a tree within accounts module 155 such that the credential may be the root of the tree. Alternatively, the accounts list may be organized as hierarchy with the credential being the top of the hierarchy.

Under each credential in the tree or hierarchy may be, for example, each account that the user 105 may have with the financial institution.

The repository module 160 may provide persistent storage for the vendor system 130. The repository module 160 may include, for example, a database, memory chips, hard drives, or any other suitable hardware components designed to store data. The repository 160 may store applications and/or data provided to the user 105 by the vendor system 130. For example, the repository module 160 may store a loan calculator software application or the like that may be provided to the user 105 via a display such as a web page in addition to the account information and/or offer information.

While the description of the vendor system 130 has heretofore been general in nature, it will be appreciated that the modules described herein may be utilized to effect a specific task relating to accounts having variable rates of interest associated therewith. In particular, the disclosed embodiments may enable the user 105 to rate lock at least a portion of the user's line of credit, for example, for a specified term without the assistance of a human intermediary, such as a financial institution's customer or financial representative. It will be understood that a rate lock offer may be presented to an eligible user 105 and processed in accordance with certain information provided by the user 105.

Figure 2:
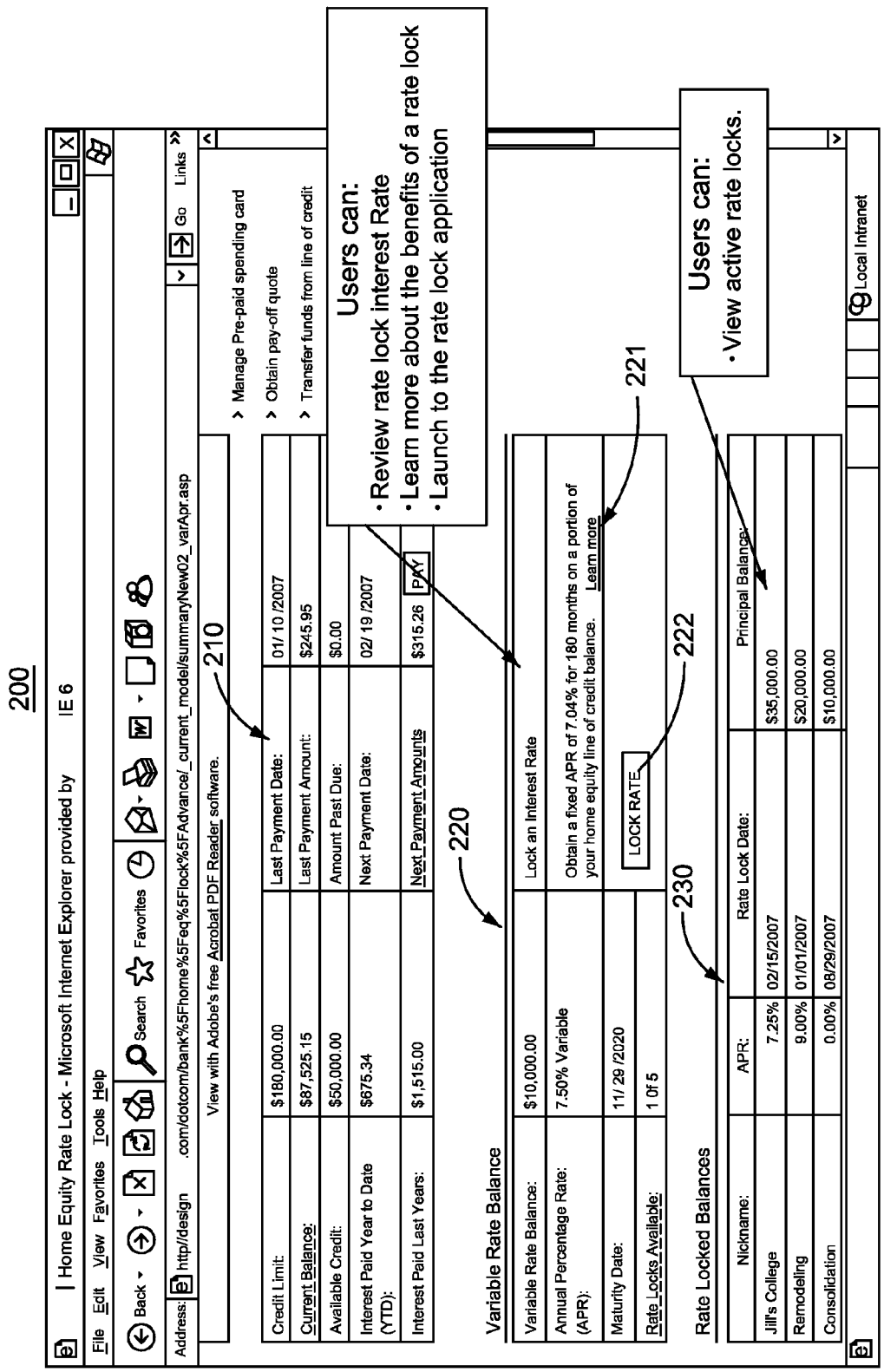
FIG. 2 is an exemplary representation of a screen display presented to the user, where information pertaining to the line of credit is summarized.

FIG. 2 depicts an exemplary display 200 that may be presented by the vendor system 130 to the user 105. As shown in FIG. 2, the display 200 may be a web page generated using, for example, HTML, Java, and the like. It will be understood that the publishing module 140 may generate the display 200 using data from the accounts module 155 so that information relating to a specified account having a variable interest rate is depicted. The display 200 may then be presented to the user 105 via the web interface and host application 145. For example, the user 105 may log into the vendor system 130 via the electronic device 110 by supplying credentials such as an account number, a username, a PIN, a password, or any other unique identifier associated with the user 105. The publishing module 140 may receive account information from the accounts module 155 corresponding to the credentials supplied by the user 105. In this way, the publishing module 140 may generate a display, such as the display 200, with the account information that may be presented to the user 105. Thus, according to an embodiment, the vendor system 130 shown in FIG. 1 may provide the user 105 the ability to view information pertaining to the account with the vendor via an account summary display, such as the display 200 shown in FIG. 2.

The display 200 may include an account summary display section 210. As shown in FIG. 2, information for an account, such as a home equity loan or line of credit, typically contained therein includes, but is not limited to, a credit limit, a current balance, and/or an available line of credit. Additionally, the account summary display section 210 may include other information pertaining to the account, such as interest paid (year-to-date and/or last year), the last or previous payment date and/or amount, and the next payment date and/or amount. A second portion of the display 200 preferably includes a variable rate balance section 220. As shown in FIG. 2, information relating to a balance due on the account subject to a variable interest rate is provided therein, including the variable rate balance amount, the annual percentage rate (variable) currently applied, and the maturity date, if applicable, for the account.

In accordance with the disclosed embodiments, the variable rate balance section 220 may include an offer to lock an interest rate for at least a portion of the variable rate balance therein. It will be understood that the offer may be generated via the offers module 150 in concert with the accounts module 155. It will be appreciated, however, that the rate lock offer may be provided only to those users that meet certain specified eligibility criteria. Examples of such eligibility criteria may include a specified minimum balance remains in the account, a specified minimum term remains for the account, and a specified number of active rate locks for the account has not been exceeded. Provided the user 105 is eligible, the fixed interest rate associated with the rate lock offer may be stated. If the user 105 is interested in obtaining additional information regarding the rate lock offer, a link 221 may be provided that may direct the user 105 to a display 300 shown in FIG. 3.

Figure 3:
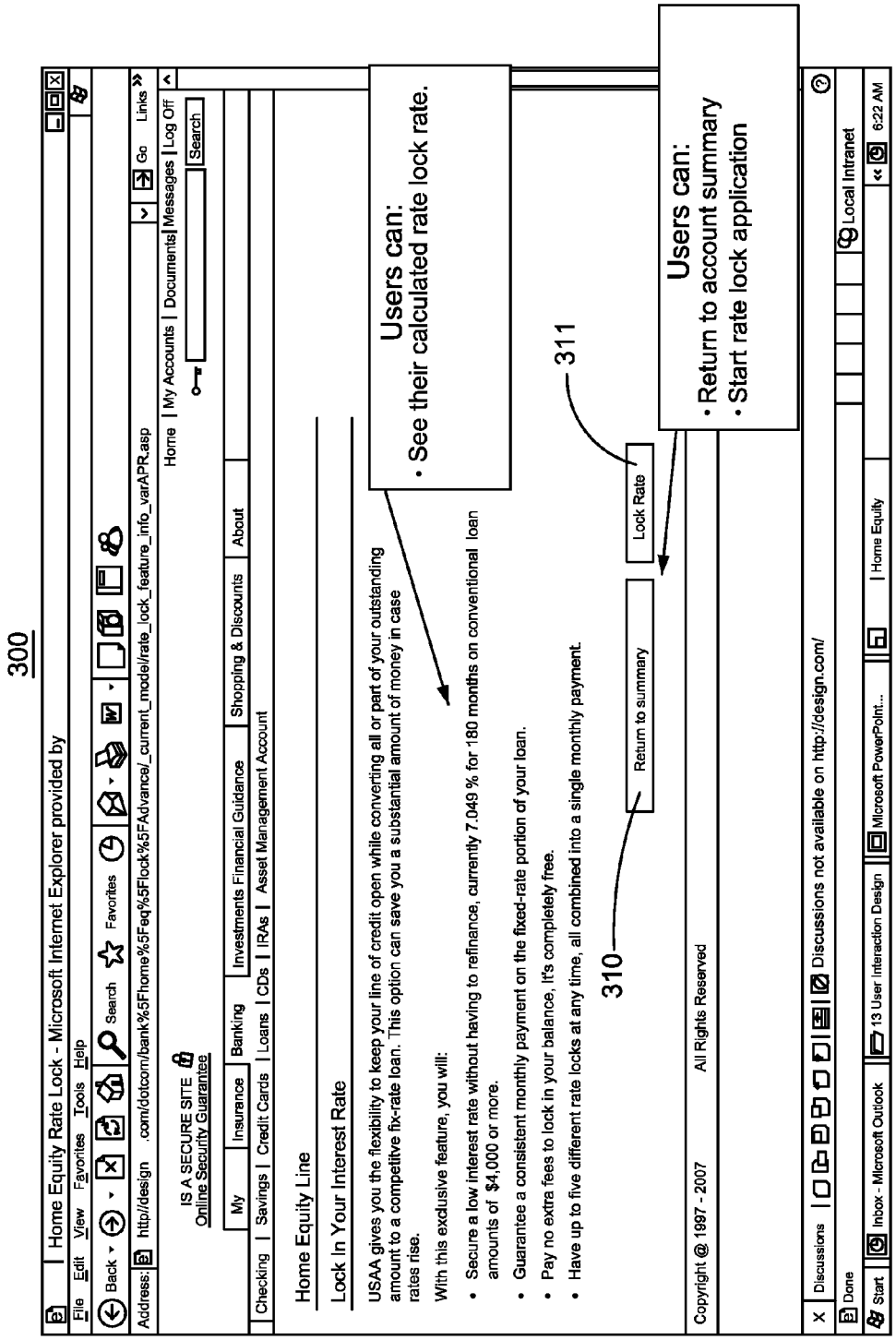
FIG. 3 is an exemplary representation of a screen display presented to the user, where additional information pertaining to a rate lock offer for at least a portion of the line of credit shown in FIG. 2 is provided.

As shown in FIG. 3, the display 300 may set forth certain information and/or requirements associated with the rate lock offer, such as a calculated interest rate therefor. After reviewing such information, the user 105 may return to the display 200 via a link 310 or advance via a link 311 to a display 400 shown in FIG. 4 for processing the rate lock offer. Of course, the user 105 may advance directly to the display 400 from the variable rate balance section 220 of the display 200 by means of a link 222. An additional section of the variable rate balance section 220 may also be reserved for the number of rate locks available.

Referring back to FIG. 2, the display 200 may further include a rate locked balances section 230. As shown in FIG. 2, information pertaining to each active (i.e., previously processed) rate lock for the account may be provided therein. Information provided in the rate locked balances section 230 for each active rate lock may include a nickname or other identifier, the annual percentage rate (APR), the rate lock date, and/or the principal balance pertaining thereto. In this way, the user 105 may easily track pertinent information associated with each previously executed rate lock.

Figure 4:
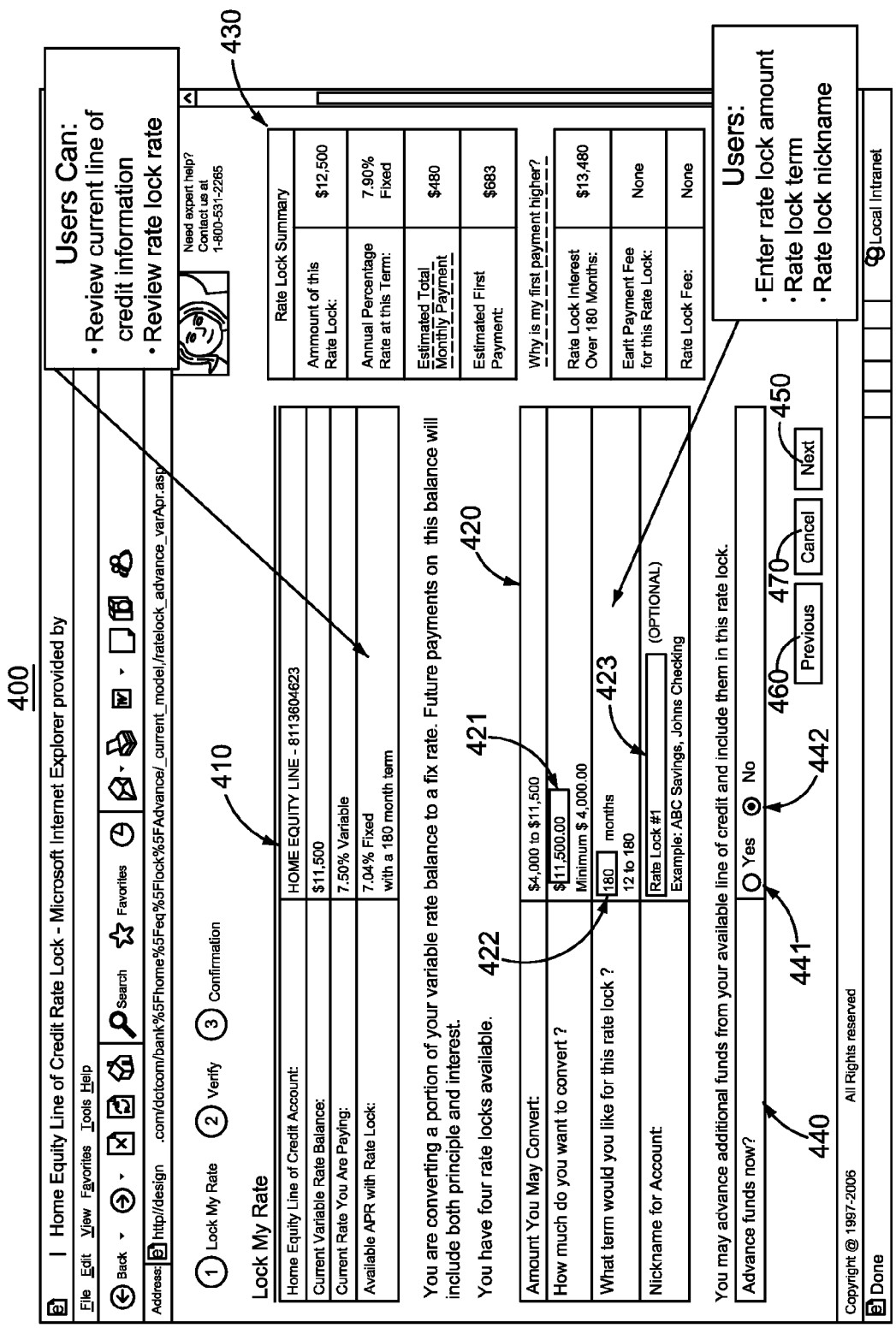
FIG. 4 is an exemplary representation of a screen display presented to the user, where information pertaining to the processing of the rate lock offer shown in FIG. 3 for the line of credit is provided.

After the user 105 has indicated his or her desire to move forward with the offered rate lock, the rate lock application may be launched and the display 400 may be presented to the user 105. As shown in FIG. 4, the display 400 may include a lock my rate section 410, which may include information that allows the user 105 to review certain information regarding the line of credit (e.g., an account number, name or other identifier, a current variable rate balance, the current rate being paid on such balance, and the available annual percentage rate with the rate lock offered). Additional information may be provided within the display 400 that further explains the rate lock offer, as well as the number of rate locks that are still available for the account.

Another section 420 of the display 400 may include one or more input fields therein requiring the user 105 to enter certain information therein. More specifically, the user 105 may enter the amount (in dollars) of the variable rate balance that he or she desires to convert to the fixed rate offer within a field 421. It will also be noted that a permissible range, as well as any applicable minimum amount, may be provided adjacent the field 421 to assist the user 105 in specifying the amount to be converted. A field 422 may be provided for the user 105 to designate the desired term (e.g., in months) for the rate lock. A permissible range for such term may be provided adjacent to the field 422 to guide the user 105. A field 423 may be located within the section 420 of the display 400 for the purpose of optionally identifying the specific rate lock being processed. The field 423 may include a nickname or other type of identifier.

To further enable the user 105 to appreciate the details of the offered rate, a rate lock summary may be provided within a section 430 in the display 400. In addition to specifying the amount of the rate lock and the annual percentage rate therefor, an estimated total monthly payment over the specified term and an estimated first payment may be provided. In addition, the amount of interest for the rate lock may be calculated over the term length. Further information regarding any early payment fees for the rate lock or any additional rate lock fees may also be provided.

A section 440 may be provided within the display 400 that queries whether the user 105 would like to advance additional funds from the credit line and include them with the offered rate lock. The indication may be made, for example, by marking appropriate bubbles 441 or 442 corresponding to "yes" or "no," respectively. Should the user 105 indicate that no additional funds are to be advanced, as indicated by marking the bubble 442, the rate lock may be processed and the user 105 may advance to the display 600 shown in FIG. 6 by selecting a "Next" button 450. Otherwise, a "Previous" button 460 may be provided for returning to the previous display (e.g., the display 200 or the display 300). The user 105 may also forego the rate lock offered by selecting a "Cancel" button 470.

Figure 5A:
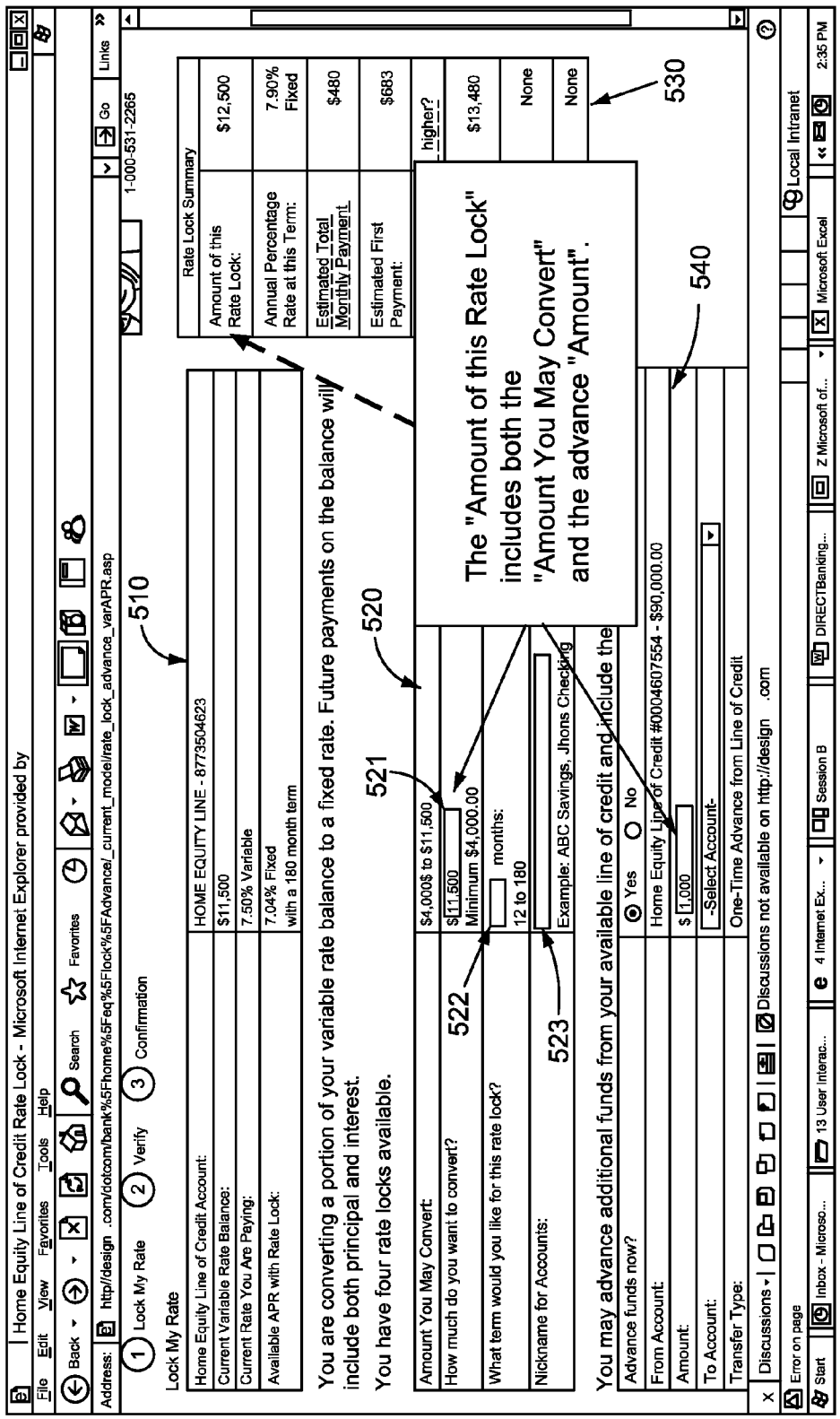
Figure 5B:
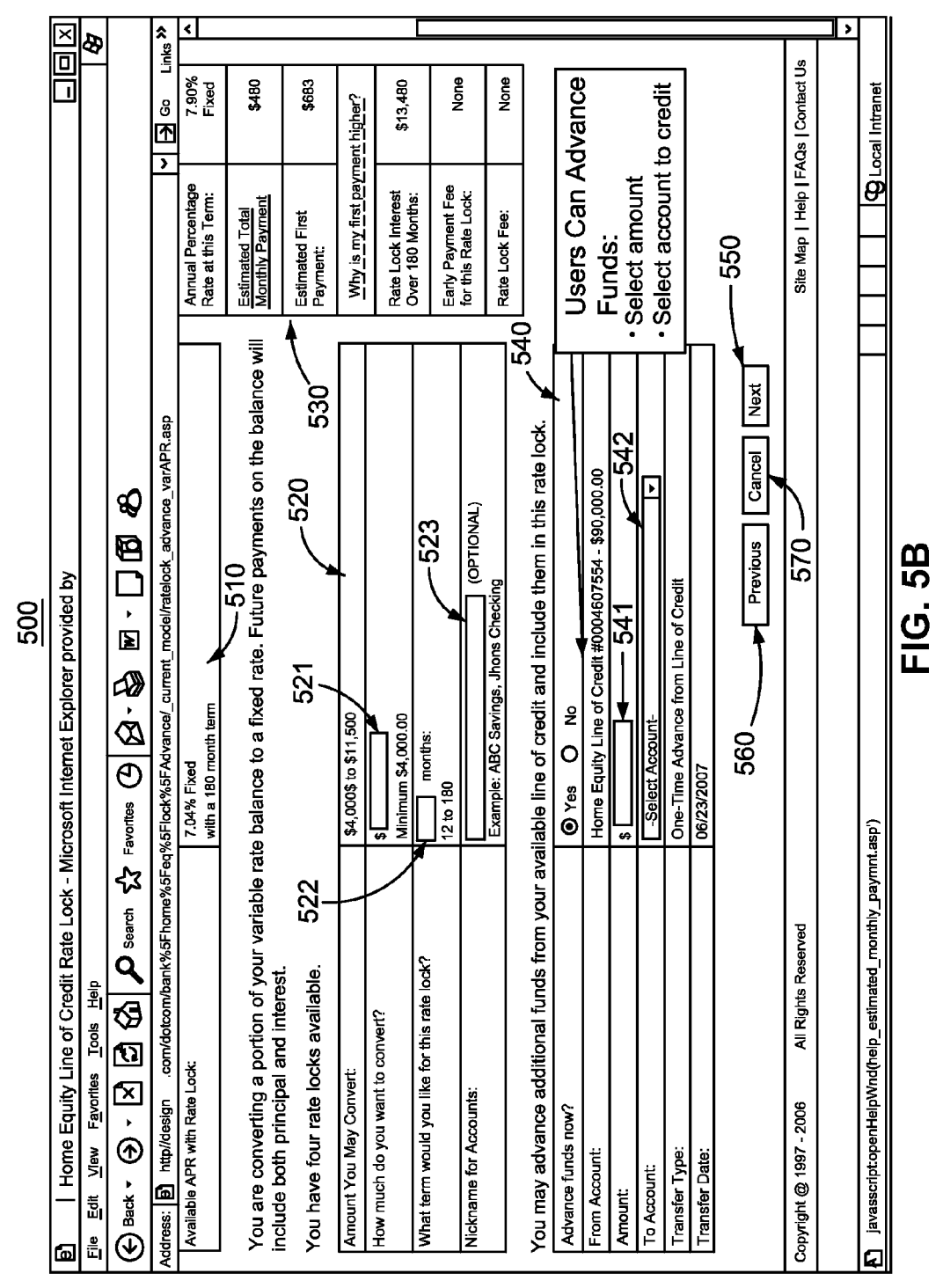

If the user 105 desires to advance additional funds, as indicated by marking the bubble 441, a display 500 may be provided by selecting the "Next" button 450. As shown in FIGS. 5A and 5B, a section 510 identified by the heading "Lock My Rate" may be provided that includes the same or similar information as that shown in the section 410 of the display 400. Further, a section 520 may be included that may be the same or similar to the section 420 in the display 400 and may include fields 521, 522, and 523 that correspond to the fields 421, 422, and 423 in the display 400. It will also be noted that the display 500 may include a rate lock summary section 530 similar to that in the section 430 of the display 400, but the amount of the rate lock may be changed to reflect the additional amount advanced.

As shown in FIG. 5B, a section 540 within the display 500 may include a field 541 and a drop-down menu 542. The field 541 may be utilized to indicate an amount to be advanced from the credit line and the drop-down menu 542 may be used to select an account to which the advance amount is to be transferred or credited. Additional information may be included in the section 540, such as identification of the credit line or account, a description of the type of transfer made, and/or the date of transfer.

The display 500 may include a "Next" button 550, a "Previous" button 560, and a "Cancel" button 570. The user 105 may advance to the display 600 shown in FIG. 6 by selecting the "Next" button 550, return to the display 400 by selecting the "Previous" button 560, and/or cancel the rate lock process by selecting the "Cancel" button 570.

To complete the rate lock process, the display 600 shown in FIG. 6 may provide certain information pertaining to the rate lock for verification. This may be summarized within a Rate Lock Information section 610, where exemplary items listed include, but are not limited to, the account number or other identifier, the annual percentage rate of the rate lock, the rate lock amount, the rate lock term, the estimated total monthly payment, the estimated first payment, the account from which an advance is made, if any, the account to which any advance is transferred, and the advance amount, if any. It will be noted that a link 611 may be provided so that the user 105 is able to edit any of the information provided within the section 610.

A section 620 may be provided within the display 600 that provides the user 105 with the option of receiving the documents pertaining to the rate lock online by selecting a checkbox 621. A checkbox 622 may also be provided so that the user 105 may choose to receive one or more documents from the vendor online.

By selecting a "Submit" button (not shown) in the display 600, the user 105 may authorize the vendor to complete the rate lock transaction. Otherwise, a "Previous" button (not shown) may be provided for the user 105 to return to the displays 400 or 500, and a "Cancel" button (not shown) may be provided so the user 105 may stop processing of the offered rate lock.

Figure 7:
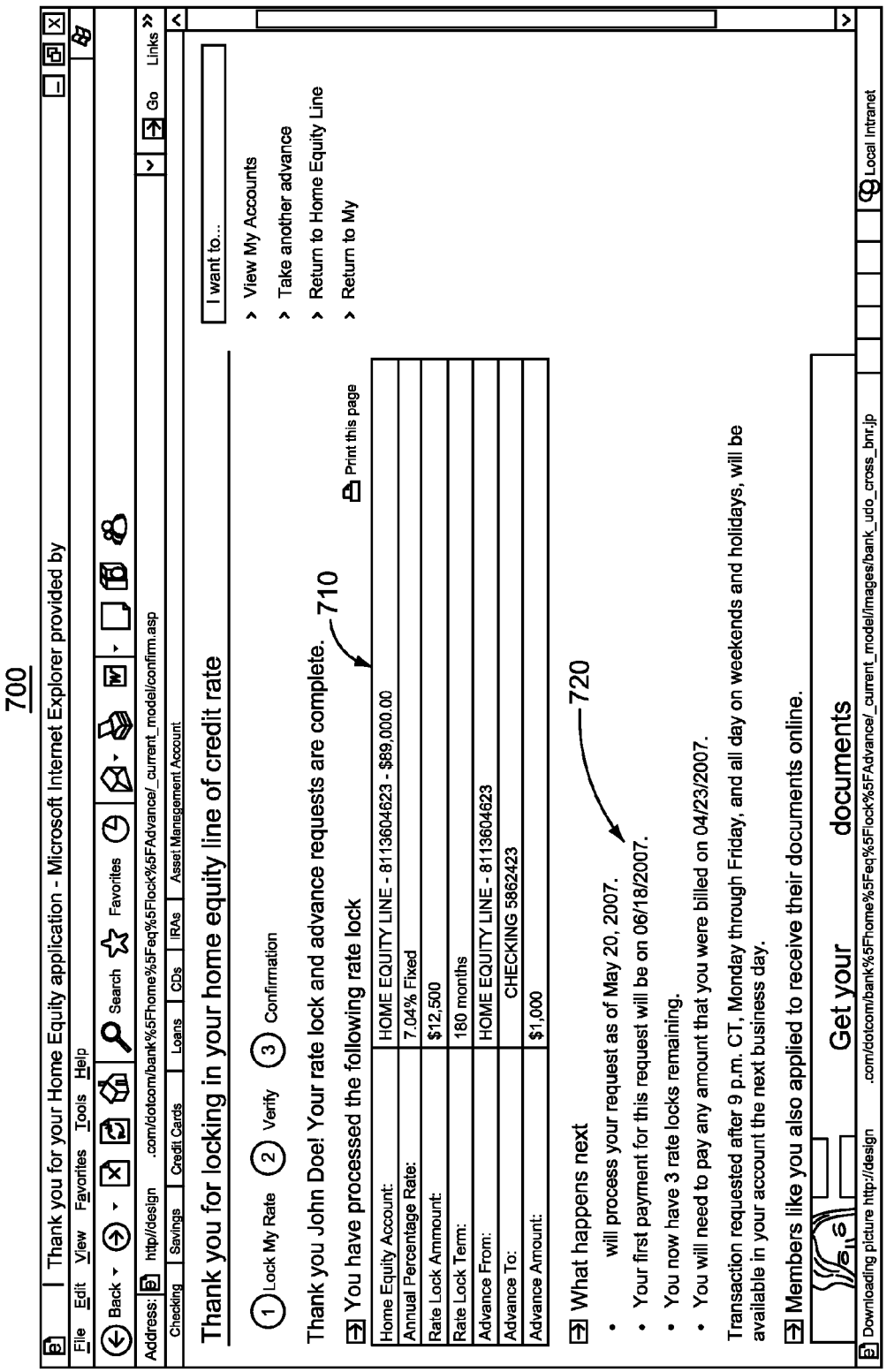
FIG. 7 is an exemplary representation of a screen display presented to the user, where agreement of the user to the terms of the rate lock offer shown in FIG. 6 is confirmed.

Once the user 105 has authorized the completion of the rate lock transaction, a display 700 shown in FIG. 7 may be provided that confirms the details of the transaction. The display 700 may include a section 710 that includes information similar to that contained in the section 610 of the display 600, but may include more or less information therein. Additionally, a section 720 may be provided to include information and/or notes pertaining to the account, such as the process date for the rate lock transaction, the due date for the first payment, the number of active rate locks for the account, any pending amounts due. Links may also be provided on the display 700 to allow the user 105 to go to a desired display within the vendor system 130.

Figure 8A:
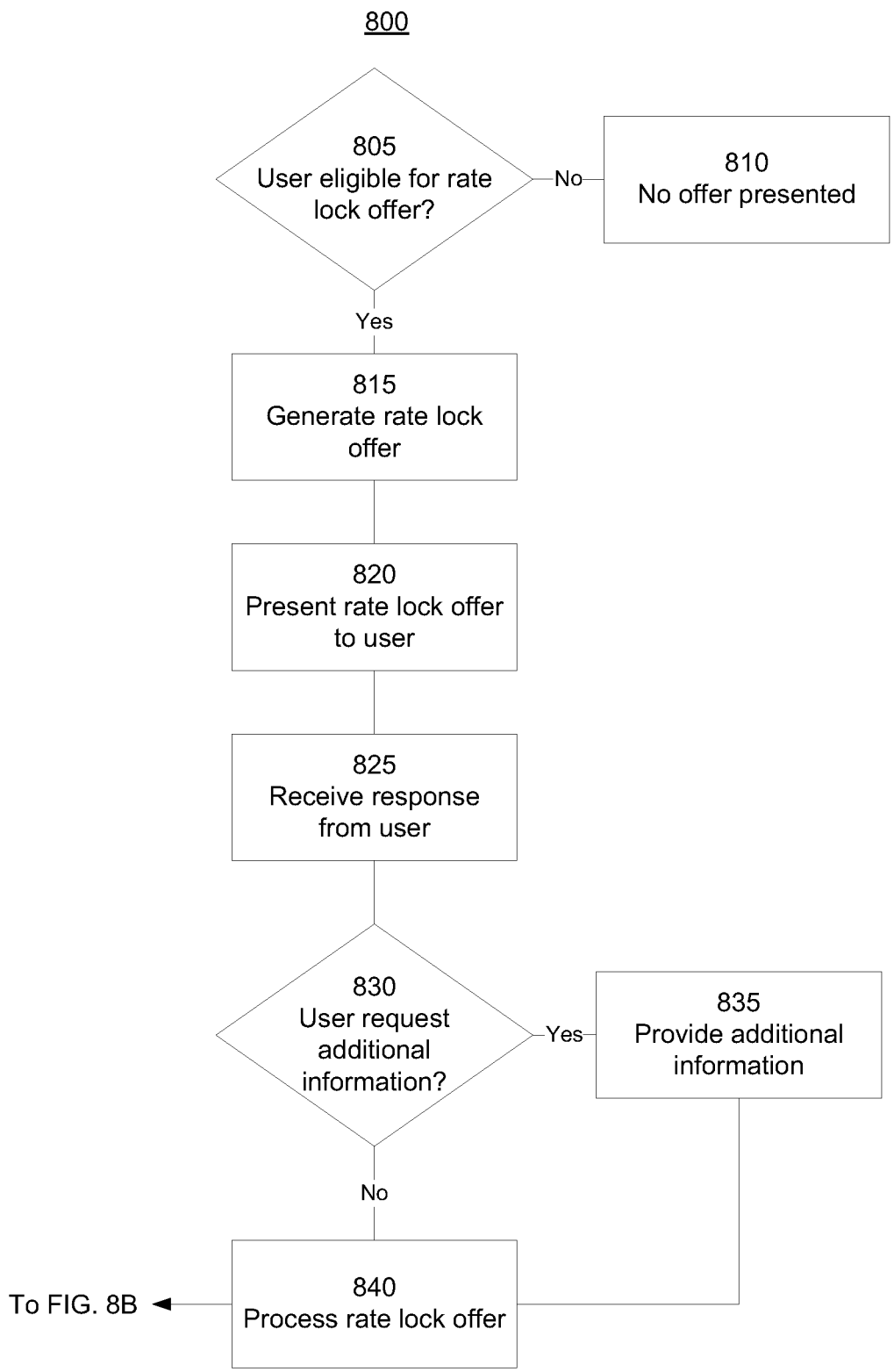
FIGS. 8A, 8B, 9A, 9B, 10A, 10B, 11A and 11B are flow diagrams depicting exemplary methods for enabling the user to rate lock at least a portion of the user's line of credit.
Figure 8B:
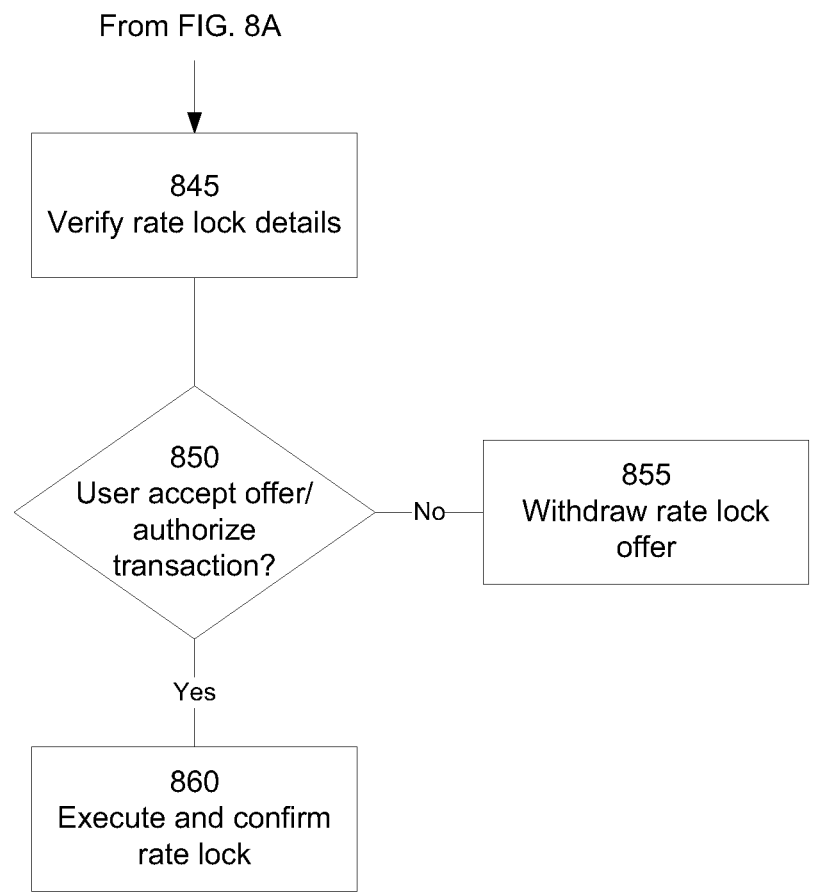

FIGS. 8A and 8B depict an exemplary method 800 of enabling the user 105 to rate lock at least a portion of a line of credit. As shown in FIG. 8A, at 805, the vendor system 130 may determine electronically whether the user 105 is eligible to receive a rate lock offer for at least a portion of the user's account, or line of credit. For example, the eligibility determination may be performed via the authentication module 135 (shown in FIG. 1) using specified criteria that may include, but is not limited to, whether a specified minimum balance remains in the credit line, whether a specified minimum term remains for the account, and/or whether a specified number of active rate locks for the accounts have been attained. At 810, a rate lock offer may not be generated and/or presented to the user 105 if the user 105 does not meet the eligibility requirements.

Provided the user 105 meets the specified eligibility requirements, the vendor system 130 may automatically calculate and generate a rate lock offer at 815. It will be understood that the rate lock offer may be specific to the user 105, such that the offer takes into account certain factors that correlate to a fixed interest rate using a rate table, credit guide or other commonly used financial tools. Exemplary factors to be considered include, but are not limited to, the credit rating or credit history of the user 105, whether the account is secured or unsecured, and/or the monetary amount involved.

Upon calculation of the rate lock offer, the vendor system 130 may electronically present the offer to the user 105 via the variable rate balance section 220 in the display 200 (shown in FIG. 2) at 820. The vendor system 130 may receive a response from the user 105 at 825. One option for the user 105 may be to request additional information regarding the rate lock offer at 830. The user 105 may then be provided with additional information via the display 300 at 835. If the user 105 does not request additional information, the user 105 may request to advance directly to the processing of the rate lock offer at 840, whereupon the user 105 may be directed to the display 400. It will be noted that the user 105 may, from the display 300, either advance to the processing of the rate lock offer at 840, return to the display 200, or cancel/decline the transaction and return to a default page.

Should the user 105 decide to continue, the rate lock offer may then be processed at 840 and the information may be provided via the display 400. It will be understood that certain information may be provided by the user 105 (e.g., amount, term, name/identifier) so that the rate lock offer can be processed. Once the rate lock offer has been processed, the details or information associated with the rate lock offer may be verified by the user 105 at 845. This may be accomplished via the display 600. If the user 105 still desires to complete the rate lock transaction, he or she may accept the offer and authorize the transaction at 850 by selecting an appropriate field or checkbox within the display 600 (shown in FIG. 6). The rate lock may be executed and a confirmation of the transaction may be generated at 860, as indicated via the display 700 (shown in FIG. 7). It will be appreciated that execution of the rate lock may include converting at least a portion of the user's line of credit to a fixed rate loan having a fixed interest rate, a fixed loan duration, and/or a fixed payment schedule. If the user 105 rejects the offer at 850, the rate lock offer may be withdrawn at 855.

Figure 9A:
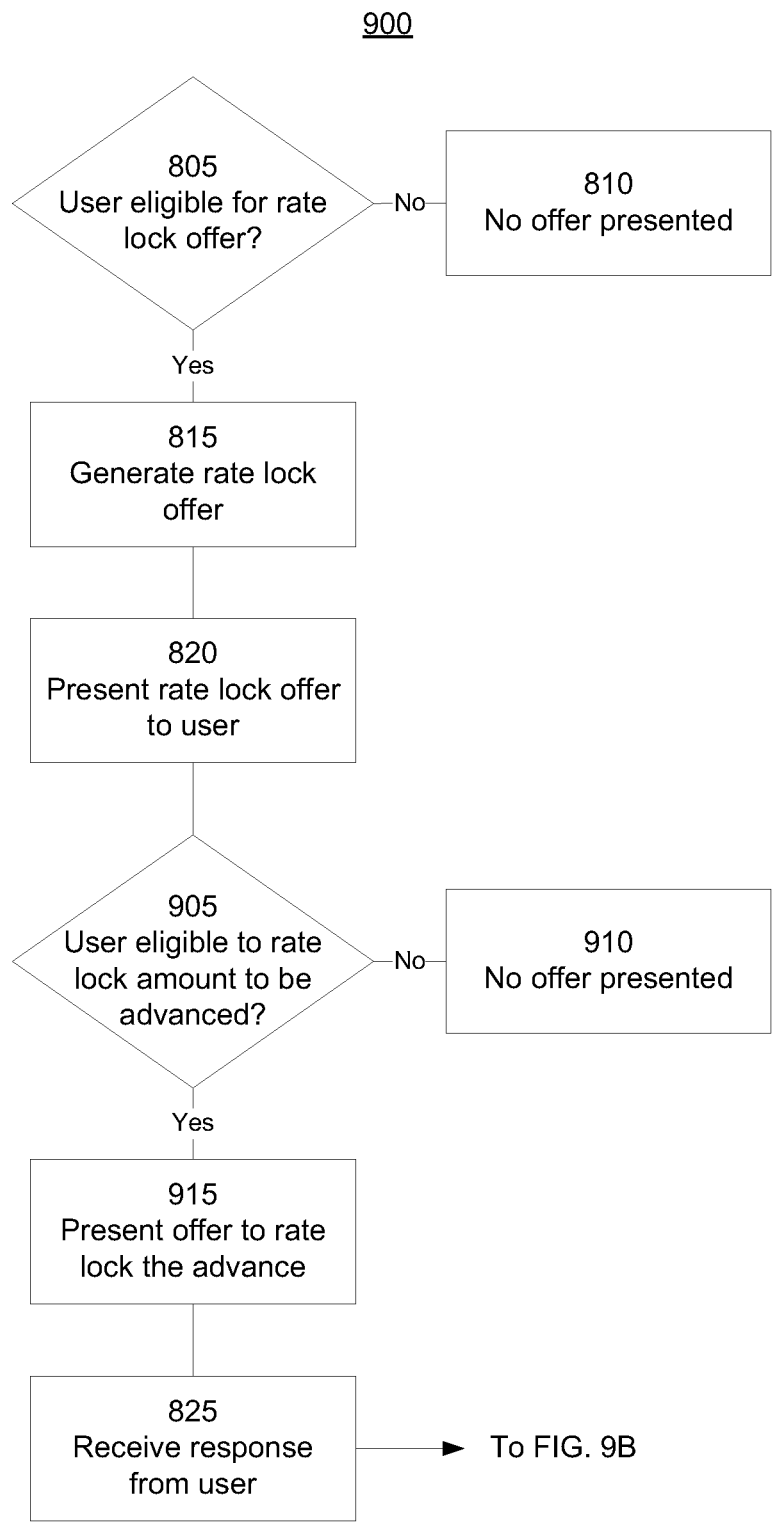
Figure 9B:
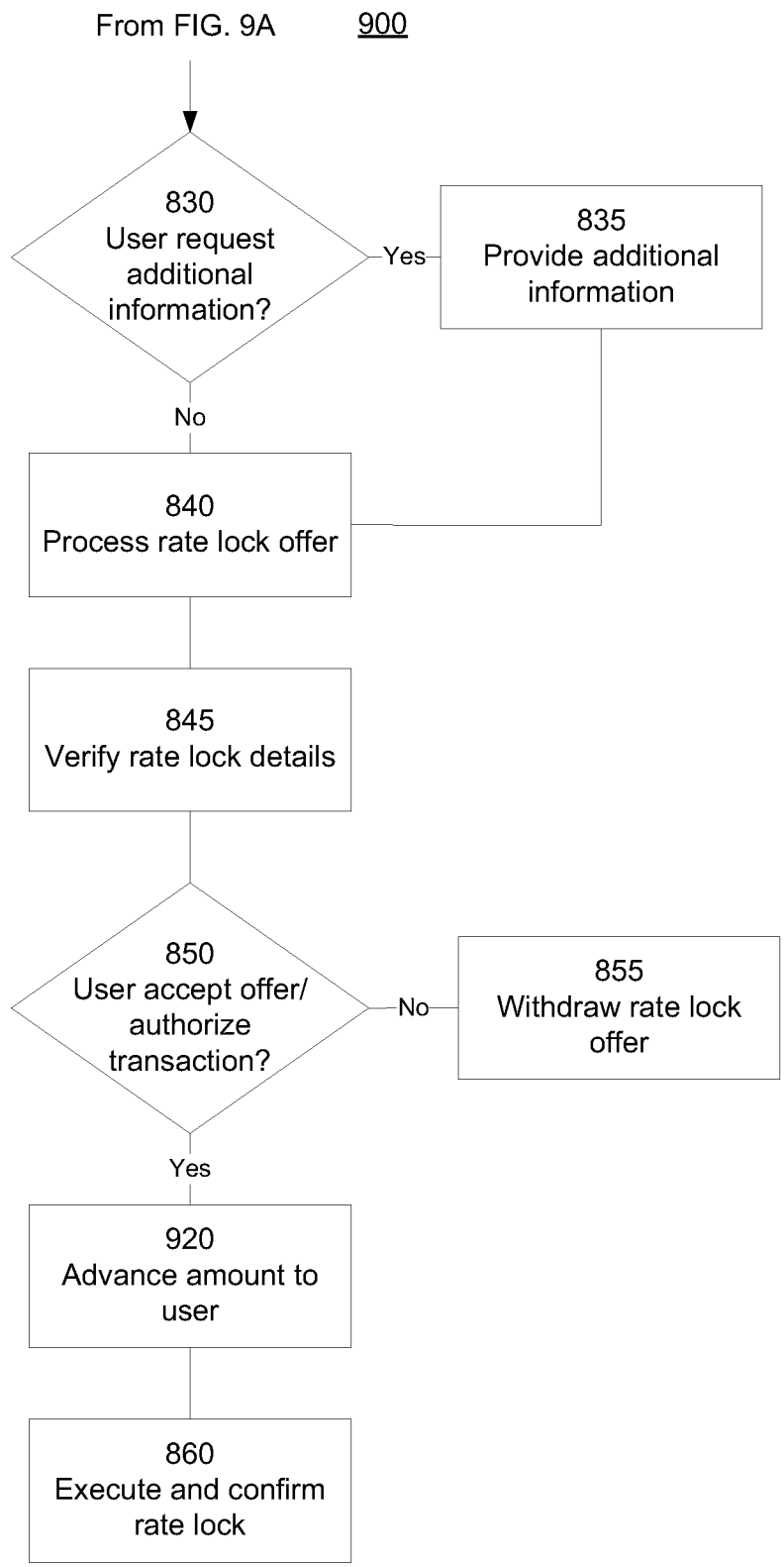

It will be appreciated that additional options may be available to the exemplary method 800 described above. In particular, it will be appreciated from an exemplary method 900 shown FIGS. 9A and 9B that additional steps or processes may be included in the method 800 to permit the user 105 to rate lock additional funds that are available to be advanced from the account (i.e., not previously charged or loaned therefrom).

For example, the vendor system 130 may need to determine whether the user 105 is eligible to receive such an advance at 905. This determination and the presentation of an offer for such advance via the display 500 may be made prior to the processing of the rate lock offer at 840 so that any advance amount requested can be incorporated into the total amount of the rate lock. If the user 105 is not eligible to rate lock funds available to be advanced from the account, an offer to rate lock such funds may not be presented to the user 105 at 910, otherwise the offer may be presented at 915.

The user 105 may provide information relating to the advance, such as the amount and the account to which it should be transferred. Accordingly, part of the processing of the rate lock conducted at 840 may include processing the advance and the display 600 may reflect verification thereof. Thus, upon authorization of the transaction by the user 105 at 850, the advanced amount may then be transferred to the designated account at 920. The rate lock offer may then be executed and a confirmation of the transaction may be provided at 860. It will be appreciated that the advancing of the amount from the line of credit and the execution of the rate lock may be performed substantially simultaneously. If the user 105 rejects the offer at 850, the rate lock offer may be withdrawn at 855.

Figure 10A:
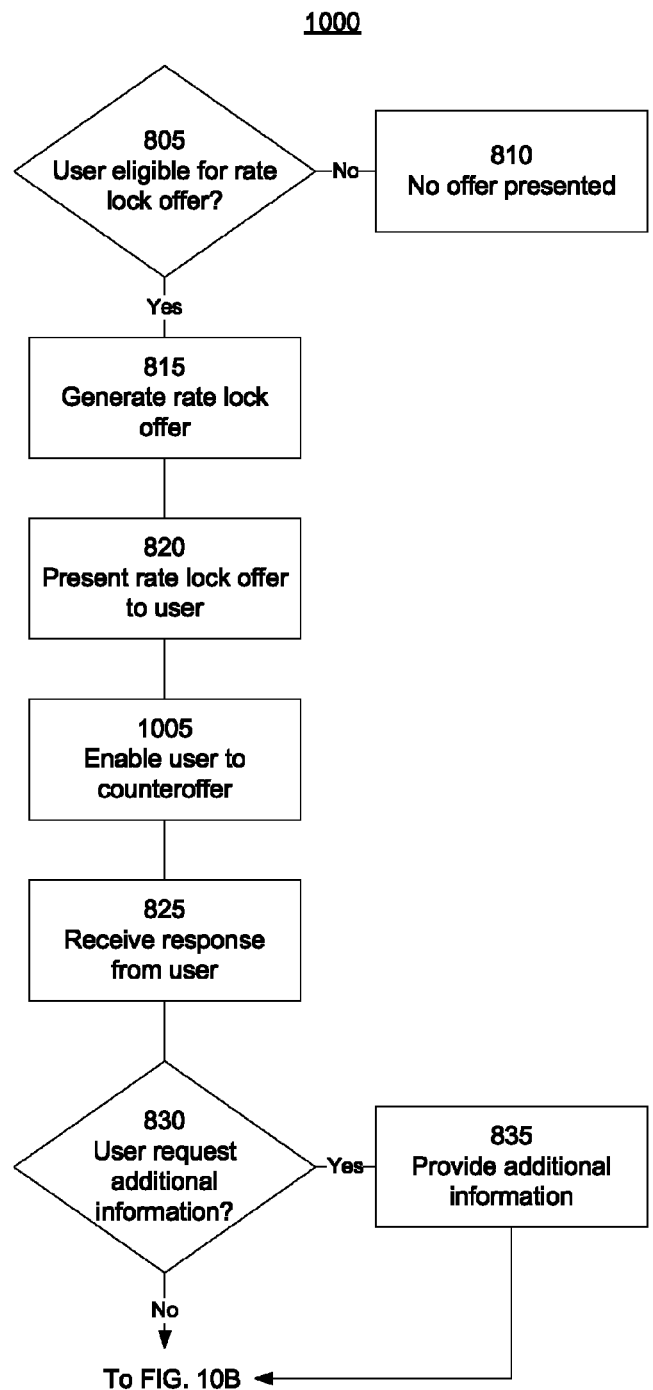
Figure 10B:
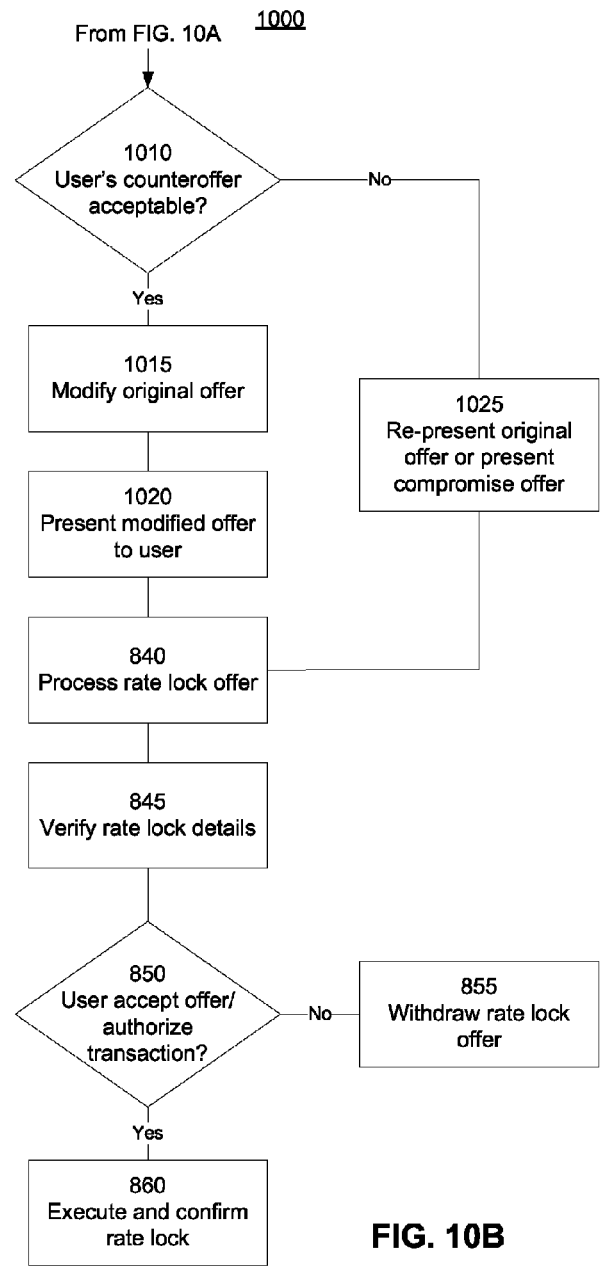

As shown in an exemplary method 1000 in FIGS. 10A and 10B, another option that may be incorporated into the methods 800 and/or 900 described above is the ability to allow the user 105 to provide a counteroffer to the rate lock offer. This may involve a counteroffer to the fixed interest rate, an amount outside of the range permitted, a term outside of the range permitted, and the like.

As shown in FIG. 10A, the steps of the method 800 described in FIG. 8 are given like reference numerals. With respect to the additional steps, it will be appreciated that the vendor system 130 may enable the user 105 to provide a counteroffer to the vendor system 130 at 1005. While not shown, this could be incorporated into the display 400, for example. The vendor system 130 may then receive a response from the user at 825. In the response, the user 105 may request additional information regarding the rate lock offer at 830. The user 105 may then be provided with additional information via the display 300 at 835. If the user 105 does not request additional information, the vendor system 130 may determine whether to accept the counteroffer at 1010. If the counteroffer is deemed acceptable, then the initial rate lock offer may be modified at 1015 and the modified rate lock offer may be presented to the user 105 at 1020. The rate lock offer may then be processed at 840. The details or information associated with the rate lock offer may be verified by the user 105 at 845. The user 105 may accept the offer and authorize the transaction at 850. The rate lock may then be executed and a confirmation of the transaction may be generated at 860. If the user 105 rejects the offer at 850, the rate lock offer may be withdrawn at 855.

If the counteroffer is deemed unacceptable, the counteroffer may be denied and the initial rate lock offer may be presented again or a compromise offer may be presented at 1025. The re-presented rate lock offer or the compromise offer may then be processed at 840 and the process may proceed as discussed above.

Figure 11A:
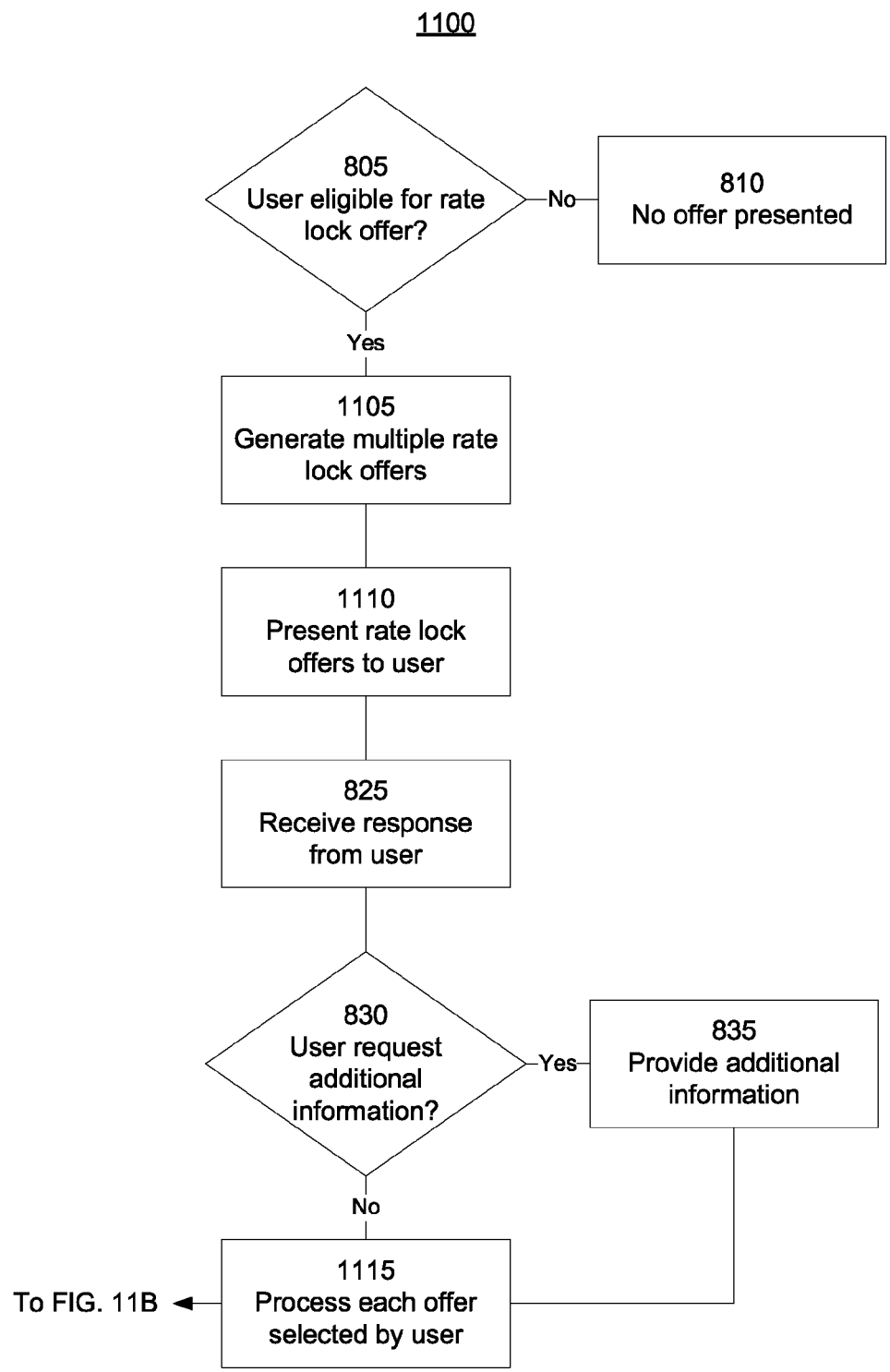
Figure 11B:
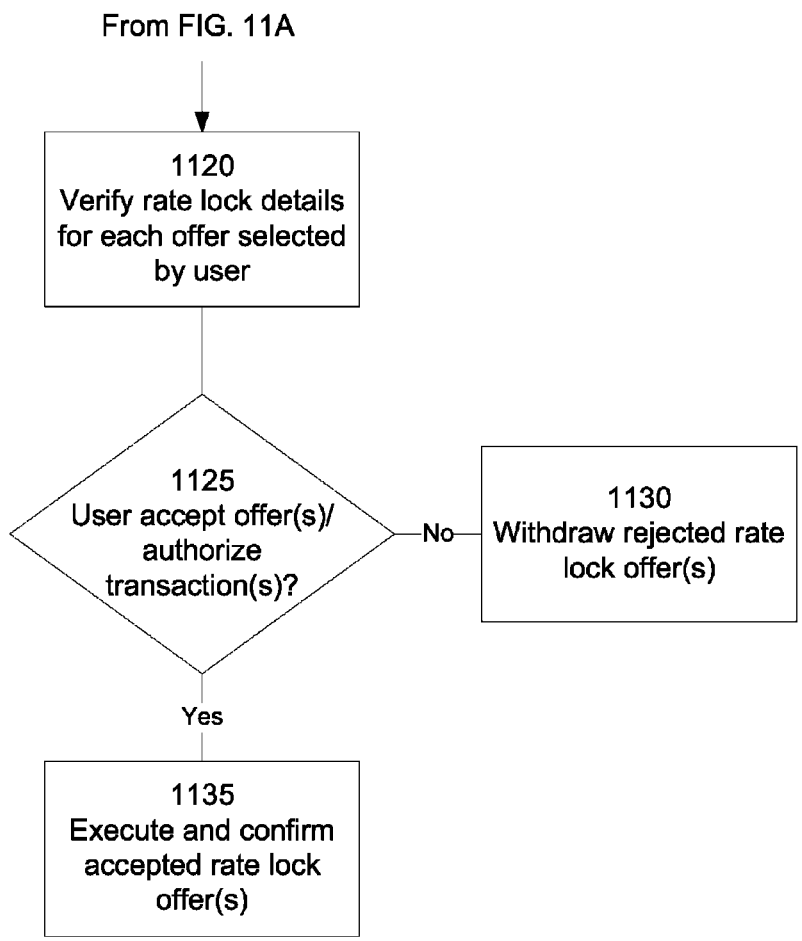

Yet another option that may be made available to the foregoing methods 800, 900, and/or 1000 is depicted in FIGS. 11A and 11B. As shown in FIG. 11A, a plurality of rate lock offers may be generated at 1105 and presented to the user 105 for consideration at 1110. While not shown, the multiple rate lock offers may be included in the display 200. Such offers may involve different fixed rates of interest depending upon the amount, the term, and/or any other relevant criteria. Preferably, a table or other tool is provided so as to provide easy comparison of the rate lock offers (e.g., the different monthly payments). In this way, the user 105 may be able to select whichever rate lock option is best for his or her situation. Accordingly, the vendor system 130 may be configured to receive the response from the user at 825, whereupon additional information is provided regarding the selected rate lock offer(s) at 835 and/or one or more selected rate lock offers are processed at 1115. The rate lock details of each select rate lock offer may be verified at 1120. The user 105 may accept each selected offer and authorize each transaction at 1125. The accepted rate lock(s) may then be executed and a confirmation of the transaction(s) may be generated at 1135. It will be appreciated that each of the rate locks selected by the user 105 may be executed substantially simultaneously. If the user 105 rejects one or more of the offers at 1125, the rejected rate lock offer(s) may be withdrawn at 1130.

While the disclosed embodiments have been described in connection with the various figures, it is to be understood that other similar embodiments may be used, or modifications and additions may be made to the disclosed embodiments for performing the same function(s) without deviating therefrom. Furthermore, it should be emphasized that a variety of computer platforms, including handheld device operating systems and other application specific operating systems are contemplated. Still further, the disclosed embodiments may be implemented in or across a plurality of processing chips or devices, and storage may similarly be effected across a plurality of devices. Therefore, the disclosed embodiments should not be limited to any single embodiment, but rather should be construed in breadth and scope in accordance with the appended claims. Also, the appended claims should be construed to include other variants and embodiments, which may be made by those skilled in the art without departing from the true spirit and scope of the disclosed embodiments.

What is claimed is:

1. A non-transitory computer-readable medium having stored thereon computer executable instructions for enabling a borrower to rate lock a portion of a line of credit having a variable interest rate, the computer executable instructions comprising instructions for:

electronically generating a first offer to rate lock a first amount at a first fixed interest rate, the first amount advanced from an approved and used line of credit associated with the borrower, the line of credit having a variable interest rate and the first amount advanced being a portion of the line of credit;

electronically generating a second offer to rate lock a second amount at a second fixed interest rate that is different than the first interest rate, the second amount available to be advanced from the line of credit associated with the borrower, the second amount being an available portion of the line of credit remaining after the first amount is advanced;

electronically receiving account information for an account to which the amount available to be advanced is to be transferred;

electronically presenting the first offer and the second offer to the borrower;

electronically receiving a response indicating the borrower's acceptance of the first offer and the second offer and an identifier for the amount advanced;

electronically executing the rate lock on the amount advanced and the amount available to be advanced from the line of credit; and transmitting information to display the identifier for the amount advanced to the borrower.

2. The non-transitory computer-readable medium of claim 1, wherein electronically executing the rate lock comprises converting the amount advanced and the amount available to be advanced from the line of credit to a fixed rate loan having a fixed interest rate, a fixed loan duration and a fixed payment schedule.

3. The non-transitory computer-readable medium of claim 1, wherein the line of credit comprises a home equity credit line or a credit card.

4. The non-transitory computer-readable medium of claim 1, wherein the advanced amount and the amount available to be advanced represents a portion of the borrower's total line of credit.

5. The non-transitory computer-readable medium of claim 1, wherein the computer executable instructions further comprise instructions for electronically determining whether the borrower is eligible for the first offer and the second offer.

6. The non-transitory computer-readable medium of claim 1, wherein the computer executable instructions further comprise instructions for electronically setting at least one term of the first offer and the second offer based on the borrower's credit history.

7. The non-transitory computer-readable medium of claim 1, wherein the computer executable instructions further comprise instructions for transmitting information to display an annual percentage rate, a rate lock date, and a principal balance associated with the amount advanced.

8. A system for enabling a borrower to rate lock a portion of a line of credit having a variable interest rate, the system comprising:

a computer processor; and memory in electronic communication with the computer processor and having a set of computer executable instructions stored on the memory that when executed by the computer processor:

electronically generates a first offer to rate lock a first amount at a first fixed interest rate, the first amount advanced from an approved and used line of credit associated with the borrower, the line of credit having a variable interest rate and the first amount advanced being a portion of the line of credit;

electronically generates a second offer to rate lock electronically generating a second offer to rate lock a second amount at a second fixed interest rate that is different than the first interest rate, the second amount available to be advanced from the line of credit associated with the borrower, the second amount being an available portion of the line of credit remaining after the first amount is advanced;

electronically receives account information for an account to which the amount available to be advanced is to be transferred;

electronically presents the first offer and the second offer to the borrower;

electronically receives a response indicating the borrower's acceptance of the first offer and the second offer and an identifier for the amount advanced;

electronically executes the rate lock on the amount advanced and the amount available to be advanced from the line of credit; and transmitting information to display the identifier for the amount advanced to the borrower.

9. The system of claim 8, wherein electronically executing the rate lock comprises converting the amount advanced and the amount available to be advanced from the line of credit to a fixed rate loan having a fixed interest rate, a fixed loan duration and a fixed payment schedule.

10. The system of claim 8, wherein the line of credit comprises a home equity credit line or a credit card.

11. The system of claim 8, wherein the advanced amount and the amount available to be advanced represents a portion of the borrower's total line of credit.

12. The system of claim 8 further comprising computer executable instructions stored on the memory that electronically determines whether the borrower is eligible for the first offer and the second offer.

13. The system of claim 8 further comprising computer executable instructions stored on the memory that electronically sets at least one term of the first offer and the second offer based on the borrower's credit history.

14. The system of claim 8 further comprising computer executable instructions stored on the memory that transmits information to display an annual percentage rate, a rate lock date, and a principal balance associated with the amount advanced.

15. A method for enabling a borrower to rate lock a portion of a line of credit having a variable interest rate, the method comprising:

electronically generating, by a computer, a first offer to rate lock a first amount at a first fixed interest rate, the first amount advanced from an approved and used line of credit associated with the borrower, the line of credit having a variable interest rate and the first amount advanced being a portion of the line of credit;

electronically generating, by a computer, a second offer to rate lock a second amount at a second fixed interest rate that is different than the first interest rate, the second amount available to be advanced from the line of credit associated with the borrower, the second amount being an available portion of the line of credit remaining after the first amount is advanced;

electronically receiving account information for an account to which the amount available to be advanced is to be transferred;

electronically presenting the first offer and the second offer to the borrower;

electronically receiving a response indicating the borrower's acceptance of the first offer and the second offer and an identifier for the amount advanced;

electronically executing, by a computer, the rate lock on the amount advanced and the amount available to be advanced from the line of credit; and transmitting information to display the identifier for the amount advanced to the borrower.

16. The method of claim 15, wherein electronically executing the rate lock comprises converting the amount advanced and the amount available to be advanced from the line of credit to a fixed rate loan having a fixed interest rate, a fixed loan duration and a fixed payment schedule.

17. The method of claim 15, wherein the advanced amount and the amount available to be advanced represents a portion of the borrower's total line of credit.

18. The method of claim 15, wherein the line of credit comprises a home equity credit line.

19. The method of claim 15 further comprising electronically determining, by a computer, whether the borrower is eligible for the first offer and the second offer.

20. The method of claim 15 further comprising electronically setting, by a computer, at least one term of the first offer and the second offer based on the borrower's credit history.

21. The non-transitory computer-readable medium of claim 1, further comprising instructions for receiving, from the borrower, a counteroffer to rate lock at least one of the first amount or the second amount at a different fixed interest rate than the first interest rate or the second interest rate, respectively.

* * * * *

UNITED STATES PATENT AND TRADEMARK OFFICE
CERTIFICATE OF CORRECTION

| | | |
|---|---|---|
| PATENT NO. | : 8,554,665 B1 | |
| APPLICATION NO. | : 11/868769 | |
| DATED | : October 8, 2013 | |
| INVENTOR(S) | : Steve Zettner et al. | |

It is certified that error appears in the above-identified patent and that said Letters Patent is hereby corrected as shown below:

Title Page, Assignee item (73): delete "United States Automobile Association (USAA), San Antonio, TX (US)" and insert --United Services Automobile Association (USAA), San Antonio, TX (US)--

Signed and Sealed this
Eighteenth Day of March, 2014

Michelle K. Lee
*Deputy Director of the United States Patent and Trademark Office*